(12) United States Patent
Smith et al.

(10) Patent No.: US 7,519,259 B2
(45) Date of Patent: Apr. 14, 2009

(54) INCREASING CAPACITY OF A TELECOMMUNICATIONS CABINET

(75) Inventors: Trevor D. Smith, Eden Prairie, MN (US); Michael K. Barth, Bloomington, MN (US); Soutsada Vongseng, Chanhassen, MN (US); Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/835,882

(22) Filed: Aug. 8, 2007

(65) Prior Publication Data

US 2008/0019655 A1   Jan. 24, 2008

Related U.S. Application Data

(63) Continuation of application No. 11/399,944, filed on Apr. 7, 2006, now Pat. No. 7,277,620, which is a continuation of application No. 10/871,555, filed on Jun. 18, 2004, now Pat. No. 7,218,827.

(51) Int. Cl.
    *G02B 6/00*   (2006.01)
(52) U.S. Cl. ..................................................... 385/135
(58) Field of Classification Search ........................ None
    See application file for complete search history.

(56) References Cited

U.S. PATENT DOCUMENTS 4,736,100 A   4/1988   Vastagh
4,747,020 A   5/1988   Brickley et al.
4,792,203 A   12/1988  Nelson et al.
4,824,196 A   4/1989   Bylander
4,861,134 A   8/1989   Alameel et al.
4,900,123 A   2/1990   Barlow et al.
4,913,522 A   4/1990   Nolf et al.
4,948,220 A   8/1990   Violo et al.
4,995,688 A   2/1991   Anton et al.
5,023,646 A   6/1991   Ishida et al.
5,058,983 A   10/1991  Corke et al.
5,073,042 A   12/1991  Mulholland et al.
5,076,688 A   12/1991  Bowen et al.

(Continued)

FOREIGN PATENT DOCUMENTS

EP   0 743 701 A2   11/1996

(Continued)

OTHER PUBLICATIONS

Complaint relating to Civil Action No. 08-CV-02234-DWF-JSM, filed Jun. 13, 2008.

(Continued)

*Primary Examiner*—Sung H Pak
(74) *Attorney, Agent, or Firm*—Merchant & Gould P.C.

(57) ABSTRACT

A housing including a plurality of openings for receiving fiber optic connectors and protecting the polished end face of the connectors from damage while the connectors are stored within a telecommunications connection cabinet. A module with a plurality of optical fiber cables connected to a first optical fiber cable and terminated by a fiber optic connector. Each of the connectors are inserted within openings in a connector holder for storage and protection until the cables need to be connected to a customer equipment cable.

39 Claims, 13 Drawing Sheets

U.S. PATENT DOCUMENTS

| | | |
|---|---|---|
| 5,142,598 A | 8/1992 | Tabone |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,363,465 A | 11/1994 | Korkowski et al. |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,647,043 A | 7/1997 | Anderson et al. |
| 5,708,751 A | 1/1998 | Mattei |
| 5,734,776 A | 3/1998 | Puetz |
| 5,764,844 A | 6/1998 | Mendes |
| 5,774,612 A | 6/1998 | Belenkiy et al. |
| 5,778,132 A | 7/1998 | Csipkes et al. |
| 5,823,646 A | 10/1998 | Arizpe et al. |
| 5,825,955 A | 10/1998 | Ernst et al. |
| 5,883,995 A | 3/1999 | Lu |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 5,975,769 A | 11/1999 | Larson et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,069,797 A | 5/2000 | Widmayer et al. |
| 6,079,881 A | 6/2000 | Roth |
| 6,096,797 A | 8/2000 | Prantl et al. |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,247,849 B1 | 6/2001 | Liu |
| 6,259,850 B1 | 7/2001 | Crosby, Jr. et al. |
| 6,271,484 B1 | 8/2001 | Tokutsu |
| 6,278,829 B1 | 8/2001 | BuAbbud et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,554,485 B1 | 4/2003 | Beatty et al. |
| 6,556,763 B1 | 4/2003 | Puetz et al. |
| 6,577,595 B1 | 6/2003 | Counterman |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,678,457 B2 | 1/2004 | Kim et al. |
| 6,760,530 B1 | 7/2004 | Mandry |
| 6,760,531 B1 | 7/2004 | Solheid et al. |
| 6,768,860 B2 | 7/2004 | Liberty |
| 6,778,752 B2 | 8/2004 | Laporte et al. |
| 6,788,786 B1 | 9/2004 | Kessler et al. |
| 6,792,191 B1 | 9/2004 | Clapp, Jr. et al. |
| 6,815,612 B2 | 11/2004 | Bloodworth et al. |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,901,200 B2 | 5/2005 | Schray |
| 6,909,833 B2 | 6/2005 | Henschel et al. |
| 6,925,241 B2 | 8/2005 | Bohle et al. |
| 6,950,593 B2 | 9/2005 | Hodge et al. |
| 6,983,095 B2 | 1/2006 | Reagan et al. |
| 7,029,322 B2 | 4/2006 | Ernst et al. |
| 7,142,764 B2 | 11/2006 | Allen et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 2001/0001270 A1 | 5/2001 | Williams Vigliaturo |
| 2002/0034290 A1 | 3/2002 | Pershan |
| 2002/0176681 A1 | 11/2002 | Puetz et al. |
| 2002/0181893 A1 | 12/2002 | White et al. |
| 2003/0113086 A1 | 6/2003 | Jun et al. |
| 2003/0174996 A1 | 9/2003 | Henschel et al. |
| 2003/0207601 A1 | 11/2003 | Adachi |
| 2004/0074852 A1 | 4/2004 | Knudsen et al. |
| 2004/0165852 A1 | 8/2004 | Erwin et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0129379 A1 | 6/2005 | Reagan et al. |
| 2005/0163448 A1 | 7/2005 | Blackwell, Jr. et al. |
| 2006/0083475 A1 | 4/2006 | Grubish et al. |
| 2006/0115220 A1 | 6/2006 | Elkins, II et al. |
| 2006/0204200 A1 | 9/2006 | Lampert et al. |
| 2008/0019644 A1 | 1/2008 | Smith et al. |
| 2008/0025684 A1 | 1/2008 | Vongseng et al. |
| 2008/0075411 A1 | 3/2008 | Solheid et al. |

FOREIGN PATENT DOCUMENTS

| | | |
|---|---|---|
| EP | 0 788 002 A1 | 8/1997 |
| EP | 0 871 047 A1 | 10/1998 |
| EP | 0 967 498 A1 | 12/1999 |
| EP | 0 975 180 A1 | 1/2000 |
| EP | 1 045 267 A1 | 10/2000 |
| JP | 63-229409 | 9/1988 |
| WO | WO 00/75706 | 12/0000 |

| | | |
|---|---|---|
| WO | WO 98/53347 | 11/1998 |
| WO | WO 02/103429 | 12/2002 |
| WO | WO 04/032532 | 4/2004 |

OTHER PUBLICATIONS 24 photos of LambdaUnite® Blank Card; "LambdaUnite® MultiService Switch (MSS)" brochure (2003); and "Lucent's LambdaUnite® Busts Out" official release (Jan. 29, 2002).

ADC Telecommunications, Inc.'s 2nd Edition of Fiber Panel Products; front cover, Table of Contents, pp. 1-111, and back cover; revised Jul. 1996, Item No. 846.

ADC Telecommunications, Inc.'s Secure Fiber Entrance Terminal (SFET) Brochure; front cover, pp. 2-7, and back cover; revised May 1998, Item No. 1005.

FONS Corporation's MDC Series Rack or Wall Mount Enclosures product sheet, 3 pages, (2002).

FONS Corporation's Modular Distribution Cabinets Rack Mount Enclosures, Model MDC-7, product sheet, 2 pages (2005) (shows the same device as shown in Exhibit A).

FONS Corporation's Technical Drawing No. 11669, Rev. D, of Distribution Cabinet Assembly MFDC-7, 1 page (technical drawing depicting the device shown in Exhibit B).

U.S. Appl. No. 11/729,425, filed Mar. 27, 2007 including Fourth Preliminary Amendment filed May 2, 2008.

Allowed claims for U.S. Appl. No. 11/729,425, filed Mar. 27, 2007, now published as U.S. Publication No. 2008/0019644.

Amendment including current listing of the claims filed Jun. 13, 2008 for U.S. Appl. No. 11/835,858, filed Aug. 8, 2007, now published as U.S. Publication No 2008/0025684.

Allowed claims for U.S. Appl. No. 11/729,310, filed Mar. 27, 2007, now published as U.S. Publication No. 2008/0075411.

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

ADC Telecommunications, Inc.'s OMX™ 600, Optical Distribution Frame Brochure; front cover, Table of Contents, pp. 1-14, and back cover; revised Feb. 2001, Item No. 854.

ADC Telecommunications, Inc.'s Outside Plant, Fiber Cross-Connect Solutions Products Brochure; front cover, Table of Contents, pp. 1-48, and back cover.; revised Jun. 2002, Item No. 1047.

AMP Inc. catalog entitled "Fiber Optic Products," front and back covers and p. 59, (4 pgs.) ( © 1991).

AT&T Network Systems catalog entitled "Fiber Optic Products Innovation for wide ranging applications," front and back covers and pp. 6-1 through 6-16 (18 pages) ( © 1995).

Brochure from Amphenol Corp. entitled "Amphenol® 954 Series one piece SC Connector," 2 pgs. (1990).

Drawings showing an ADC fiber storage trough concept including presentation entitled "Fujitsu Fiber Management Project Fiber Trough Concept", 11 pages (Jun. 2002).

Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).

HRS catalog entitled "Optical Fibre Connectors," front and back covers and pp. 16, 17 and 49 (5 pages) (Mar. 1991).

Iwano, S. et al., "MU-type Optical Fiber Connector System," *NTT Review*, vol. 9, No. 2, pp. 63-71 (Mar. 1997).

NTT Int'l Fiber Termination Module (FTM) & Premises Optical Distribution Cabinets (PODC) product brochure, 3 pages, undated.

"Retainer Staright [sic] Removable SC," which shows a latch design, 2 pages (Jan. 17, 2006).

Sugita, E. et al., "SC-Type Single-Mode Optical Fiber Connectors," *Journal of Lightwave Technology*, vol. 7, No. 11, pp. 1689-1696 (Nov. 1989).

First Amended Complaint, *ADC Telecommunication, Inc. and Fiber Optic Network Solutions Corp.* v. *AFL Telecommunications LLC*, Civil Action No. 0:08-cv-02234-DWF-JSM, 8 pages (Aug. 14, 2008).

Defendant's Answer and Defenses in Response to the First Amended Complaint, *ADC Telecommunication, Inc. and Fiber Optic Network Solutions Corp.* v. *AFL Telecommunications LLC*, Civil Action No. 0:08-cv-02234-DWF-JSM, 14 pages (Dec. 8, 2008).

Amended Order for Pretrial Conference, *ADC Telecommunication, Inc. and Fiber Optic Network Solutions Corp.* v. *AFL Telecommunications LLC*, Civil Action No. 0:08-cv-02234-DWF-JSM, 5 pages (Dec. 11, 2008).

ADC Telecommunications, Inc., brochure titled *OMX™ 600: Optical Distribution Frame*, © 2001 (17 pages).

ADC Telecommunications, Inc., brochure titled *Value-Added module System*, © (29 pages).

ADC Telecommunications, Inc., brochure titled *Value-Added module System: Optical Distribution Frame (OMX™ 600)*, © 2001 (12 pages).

Installation drawings having drawing No. 1069965, dated Aug. 14, 1999 (3 pages).

Fiber distribution drawings having drawing No. 1069967, dated Aug. 17, 1999 (2 pages).

Assembly reference drawings having drawing No. 1067101, dated Aug. 17, 1999 (2 pages).

Connectorized splitter drawings having drawing No. 1067961, dated Aug. 18, 1999 (8 pages).

Nexans, Cross-Connect Cabinet III: Plastic Watertight Cabinet for FTTH Applications, dated 2002 (2 pages).

Nexans, Cross-Connect Cabinet V: Metallic Watertight Cabinet for FTTH Applications, dated 2002 (2 pages).

Complaint relating to Civil Action No. 08-CV-5222-RMK-JJK, filed Sep. 19, 2008 (8 pages).

Nexans Interface.com, Cross-Connect Cabinett III, 2002, 2 pages.

Nexans Interface.com, Cross-Connect Cabinet V, 2002, 2 pages.

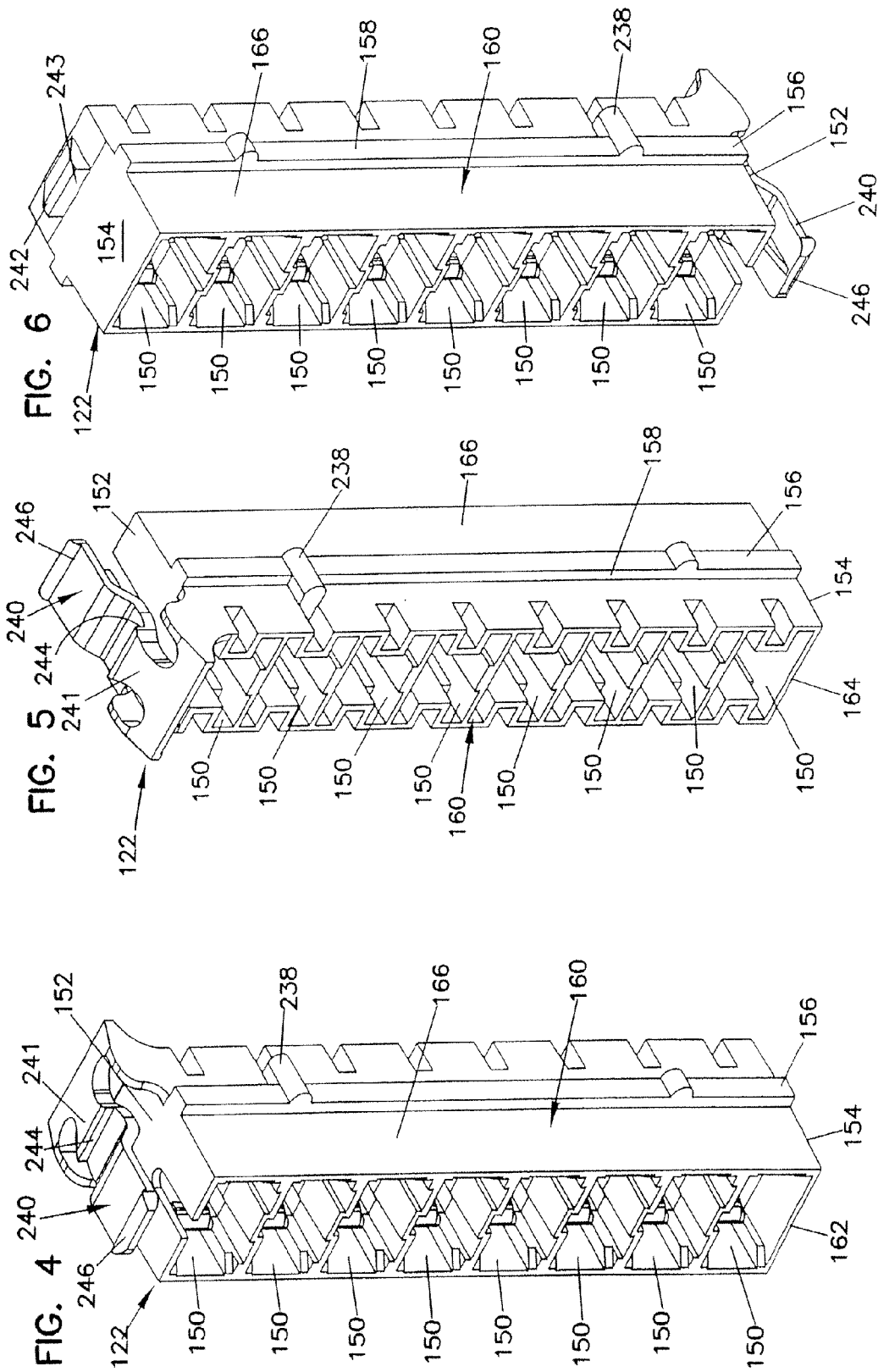

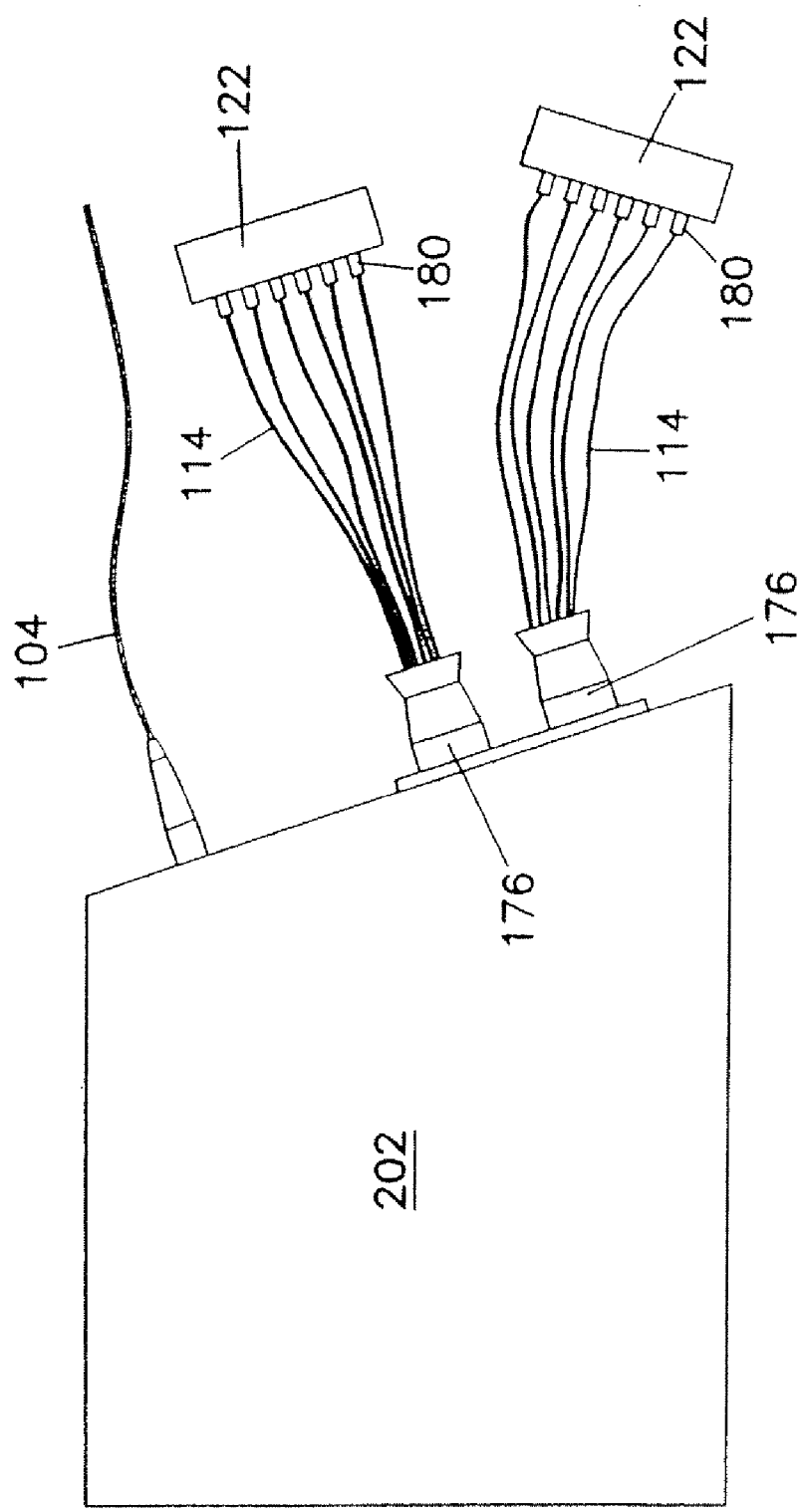

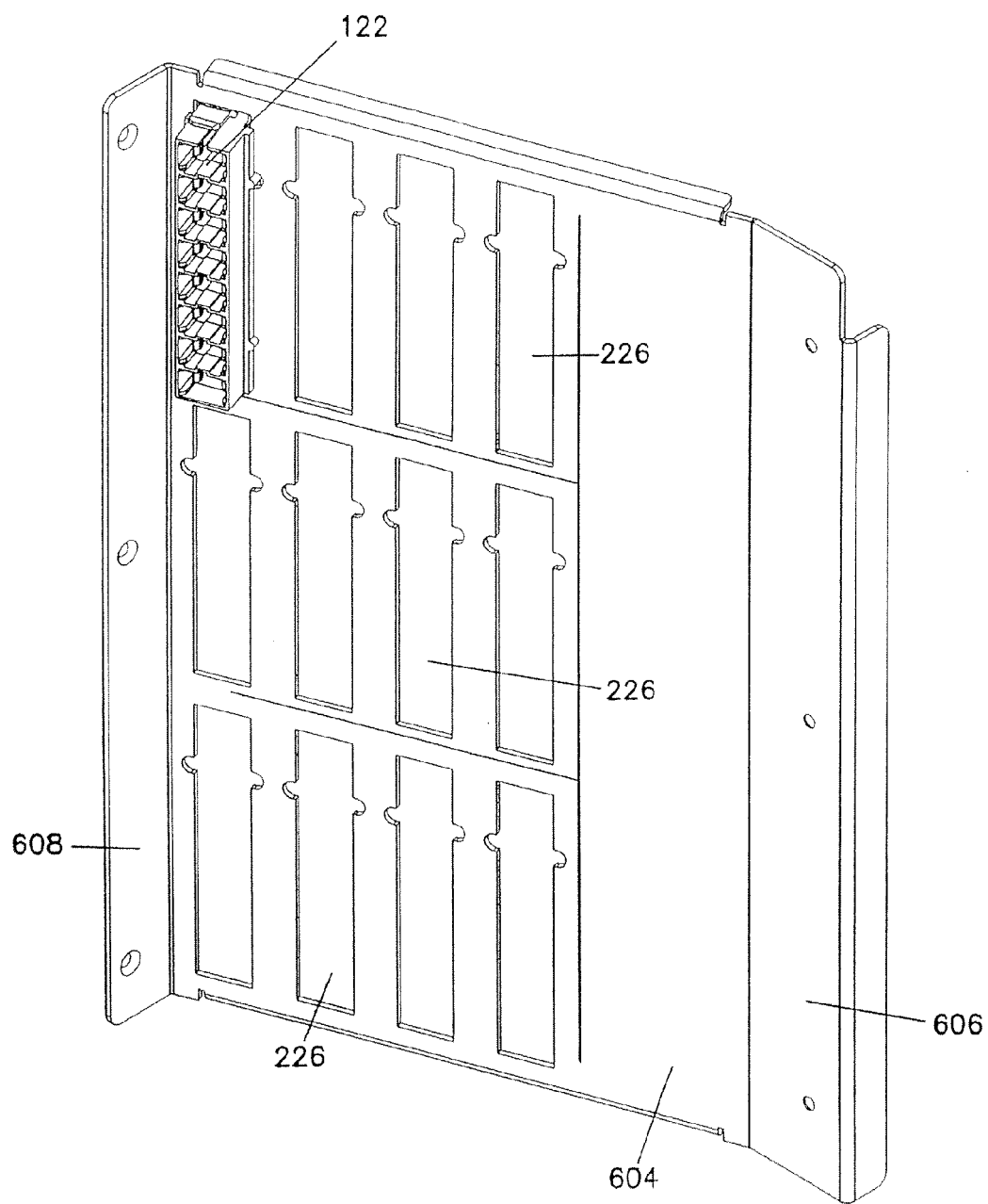

INCREASING CAPACITY OF A TELECOMMUNICATIONS CABINET

CROSS REFERENCE TO RELATED APPLICATION

This application is a continuation of application Ser. No. 11/399,944 filed on Apr. 7, 2006, now issued as U.S. Pat. No. 7,277,620, which is a continuation of application Ser. No. 10/871,555 filed on Jun. 18, 2004, now issued as U.S. Pat. No. 7,218,827, which applications are hereby incorporated by reference in their entirety.

FIELD

The present invention relates generally to fiber optic telecommunications connection devices. More specifically, the present invention relates to multi-position holders for fiber optic connectors.

BACKGROUND

Fiber optic connectivity and service is being extended to more and more customers, both commercial and residential. However, not all customers to whom this service is available are currently ready to accept and utilize such service. Additionally, new service and connection devices may be provided in residential or commercial real estate development projects but at a time prior to when the units are constructed or ready for occupancy. In such circumstances, it is desirable to have an easily scalable solution for aiding connection of new customers to existing connections within a piece of installed connection equipment and expansion of the number of connections available within that installed equipment.

SUMMARY

The present invention relates to a telecommunications equipment cabinet including a splitter connecting an outside plant cable to a plurality of fiber optic cables. The cabinet includes a splitter mounting area, a cable management structure, an array of adapters for optically connecting two fiber optic cables terminated with connectors, and an excess cable storage area. Customer equipment cables are connected to rear of adapters within the adapter array. Cables from the splitter are directed to the cable management structure and to the excess cable storage area where connectors terminating these cables are stored and protected until a connection between the outside plant cable and the customer equipment cable is desired.

The present invention further relates to a connector holder with at least one opening in a housing for receiving a fiber optic connector and protecting a polished end face of the connector. The connector holder includes a housing with a releasable latch on one end and a mounting tab on the other end which cooperate to releasably mount the housing within an opening in a bulkhead.

The present invention still further relates to a method of increasing the connection capacity of a fiber optic telecommunications connection cabinet. A splitter is mounted in the cabinet and a cable from the splitter is connected to an outside plant cable. The splitter splits an optical signal from the outside plant cable into a plurality of optical fiber cables terminated with optical fiber connectors. This plurality of cables is directed from the splitter to a cable management area and to an excess cable storage area. A plurality of connectors of these cables are inserted within a connector holder and the connector holder is inserted within a mounting opening in the excess cable storage area. The cabinet includes an array of adapters which may be used as needed to connect a cable from the splitter to a customer equipment cable.

The present invention still further relates to a splitter.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 4 is a front perspective view of a multi-position fiber optic connector holder according to the present invention.

FIG. 5 is a rear perspective view of the multi-position fiber optic connector holder of FIG. 4.

FIG. 6 is a second rear perspective view of the multi-position fiber optic connector holder of FIG. 4.

FIG. 14A is a top view of a fiber optic device according to the present invention.

FIG. 19 is a front perspective view of a mounting bulkhead for receiving a multi-position fiber optic connector holder as shown in FIG. 18, with a multi-position fiber optic connector holder inserted within one of a plurality of mounting openings.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
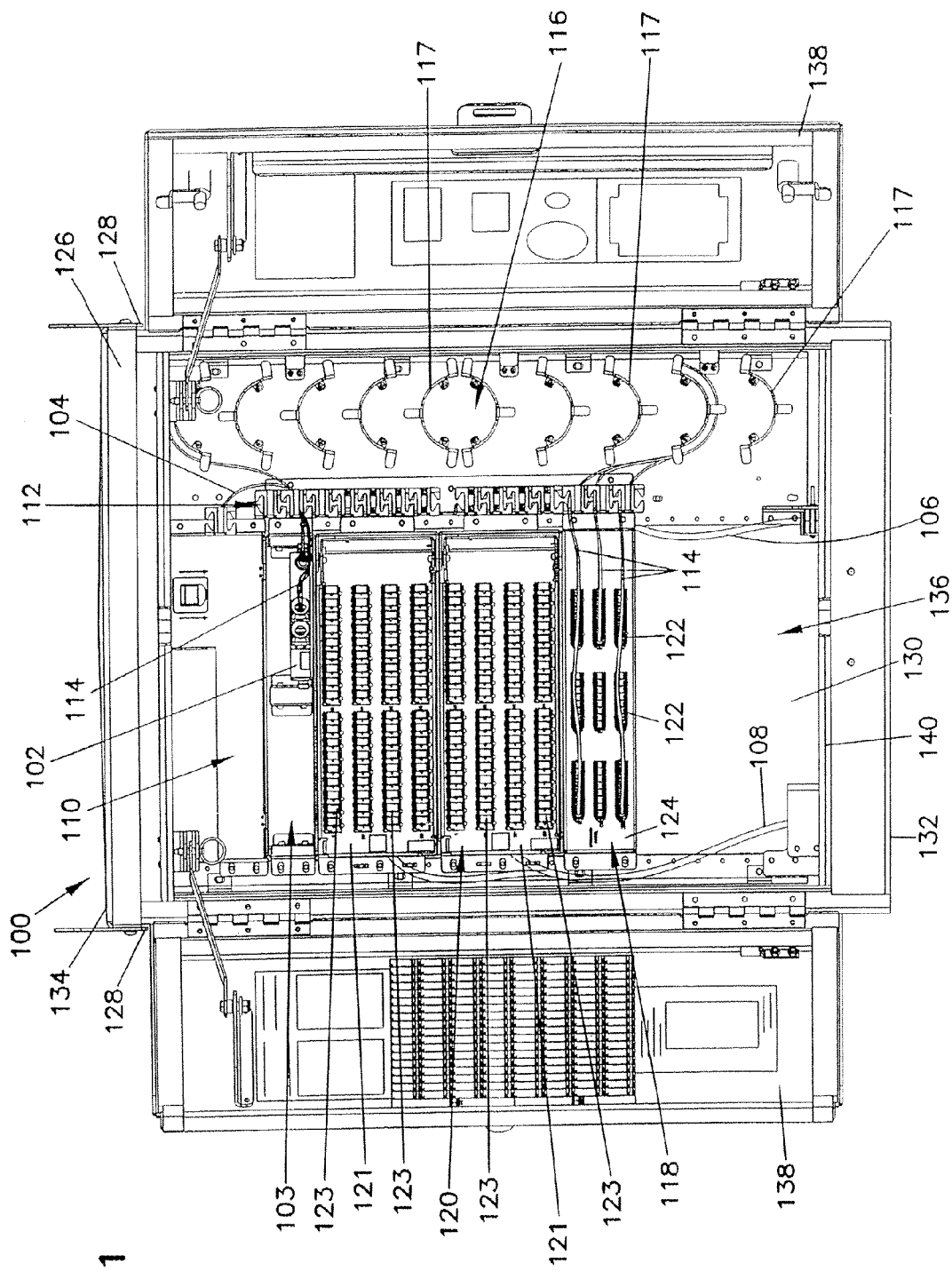
FIG. 1 is a front view of a fiber optic telecommunications connection cabinet including a multi-position fiber optic connector holder according to the present invention, with only illustrative cables shown to indicate routing.

FIG. 1 shows a telecommunications connection cabinet 100 such as might be mounted on a pedestal or other mount in an area where fiber optic connectivity for customers is desired. Cabinet 100 provides a location for outside plant fiber optic cables to be connected to fiber optic distribution cables. The distribution cables are then lead to customer equipment to provide fiber optic service and connectivity at the customer's location. A typical arrangement for providing service to customers might include utilizing a splitter to break the signal from an outside plant (OSP) cable into a plurality of distribution cables, each distribution cable providing a connection to a particular piece of customer equipment. A common splitter might separate the optic signal within the OSP cable into thirty-two individual signals and also combine those thirty-two signals into the OSP cable in a bi-directional communication configuration. Cabinet 100 is similar in nature to that disclosed in the commonly-owned U.S. patent application Ser. No. 10/613,764, filed on Jul. 2, 2003, entitled "Telecommunications Connection Cabinet," the disclosure of which is incorporated herein by reference.

A plurality of cables 108 connected to the customer equipment may be directed into cabinet 100. One or more OSP cables 106 may be directed into cabinet 100 to a splice arrangement, such as a splice tray or panel 110. OSP cables 106 may be spliced within splice panel 110 to a secondary cable 104. Secondary cable 104 is directed from splice panel 110 to a first cable management structure 112 and lead to a splitter 102 within a splitter mounting area 103. Splitter 102 separates the optical signal transmitted over OSP cable 106 and secondary cable 104 into up to thirty-two signals directed into an equal number of fiber distribution cables 114. Cables 114 are directed from splitter 102 through cable management area 112 and into a second cable management and slack storage area 116 including a plurality of cable slack storage spools 117. From slack storage area 116, cables 114 may be directed to either a connector holder within an excess cable storage area 118 or to an adapter within an adapter array 120. Each of these cables 114 are preferably terminated with a fiber optic connector.

Within excess cable storage area 118, a plurality of connector holders 122 are installed within mounting slots in a bulkhead 124. Connector holder 122 (described in further detail below) includes a plurality of openings for receiving and releasably holding the fiber optic connector. The openings in connector holder 122 preferably do not provide a continuous optical path but rather house and protect a polished end face of an optical fiber within each cable 114 which is mounted to the terminal fiber optic connector. This protection may be provided in combination with an endcap, such as shown in commonly-owned U.S. patent application Ser. No. 10/610,325, filed on Jun. 30, 2003, entitled "Fiber Optic Connector Holder and Method," the disclosure of which is incorporated herein by reference. Alternatively, connector holder 122 may enclose and protect the polished end face of the connector terminating cable 114 without the need for a protective endcap.

Within adapter array 120, a plurality of fiber optic adapters 123 are mounted which receive the connector terminating cable 114. The connector of cable 114 is received within an opening in a front side of an adapter 123. Adapter 123 also includes an opening on an opposite rear side which is adapted to receive a connector terminating one of the customer equipment cables 108. Adapters 123 within adapter array 120 may optically connect one of the cables 114 to one of the cables 108, for transmission of an optical signal from OSP cable 106 to the customer equipment connected to that cable 108. Such cable terminating connectors and adapters 123 are well known in the industry. As shown in FIG. 1, the connectors are SC connectors and it is anticipated that other types, formats, styles and sizes of telecommunications connectors may be used.

Cabinet 100 includes a front 126, a pair of opposing sides 128, a rear wall 130, a base 132 and a top 134, all cooperating to define an interior 136 within which the various components described above are mounted. The components are accessible through an opening 140 in front 126 which may be closed off by a pair of doors 138.

Figure 2:
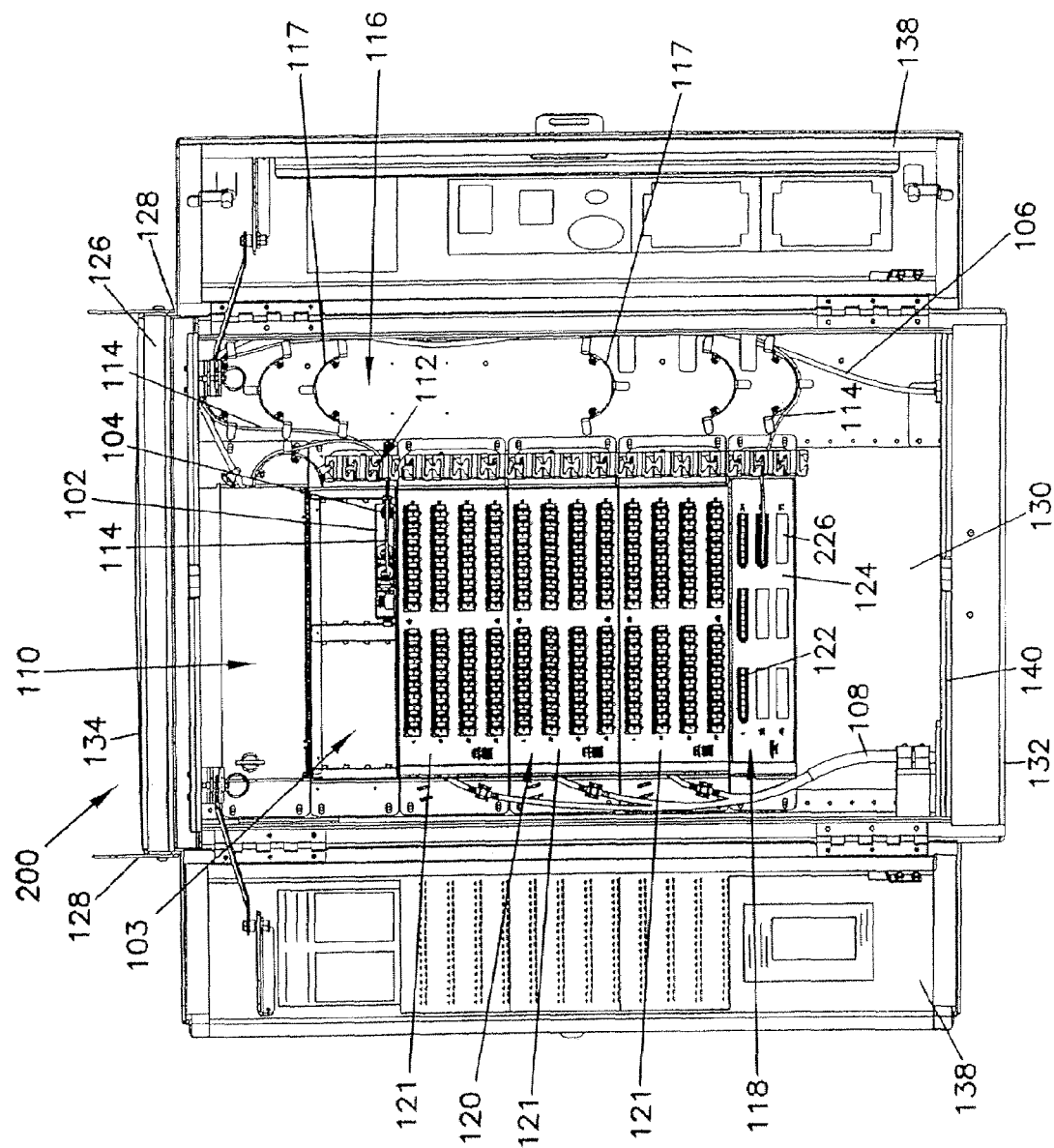
FIG. 2 is a front view of a second embodiment of a fiber optic telecommunications connection cabinet including a multi-position fiber optic connector holder according to the present invention, with only illustrative cables shown to indicate routing.

Referring now to FIG. 2, an alternative embodiment 200 of a telecommunications connection cabinet includes the same components as cabinet 100. Some of the components are altered in appearance or location but the functional characteristics are similar to cabinet 100. Cabinet 100 includes a pair of adapter array panels 121, and each panel 121 includes a total of four rows of eighteen adapters 123, or seventy-two adapters 123. Cabinet 200 includes three such adapter array panels, totaling two hundred sixteen adapters 123. Both cabinets 100 and 200 include a single bulkhead 124 within excess cable storage area 118. Each bulkhead 124 includes openings for mounting three rows of three connector holders 122. Each connector holder 122 includes a total of eight openings for receiving, storing and protecting eight cable connectors of cables 114, providing total storage for up to seventy-two connectors.

Figure 3:
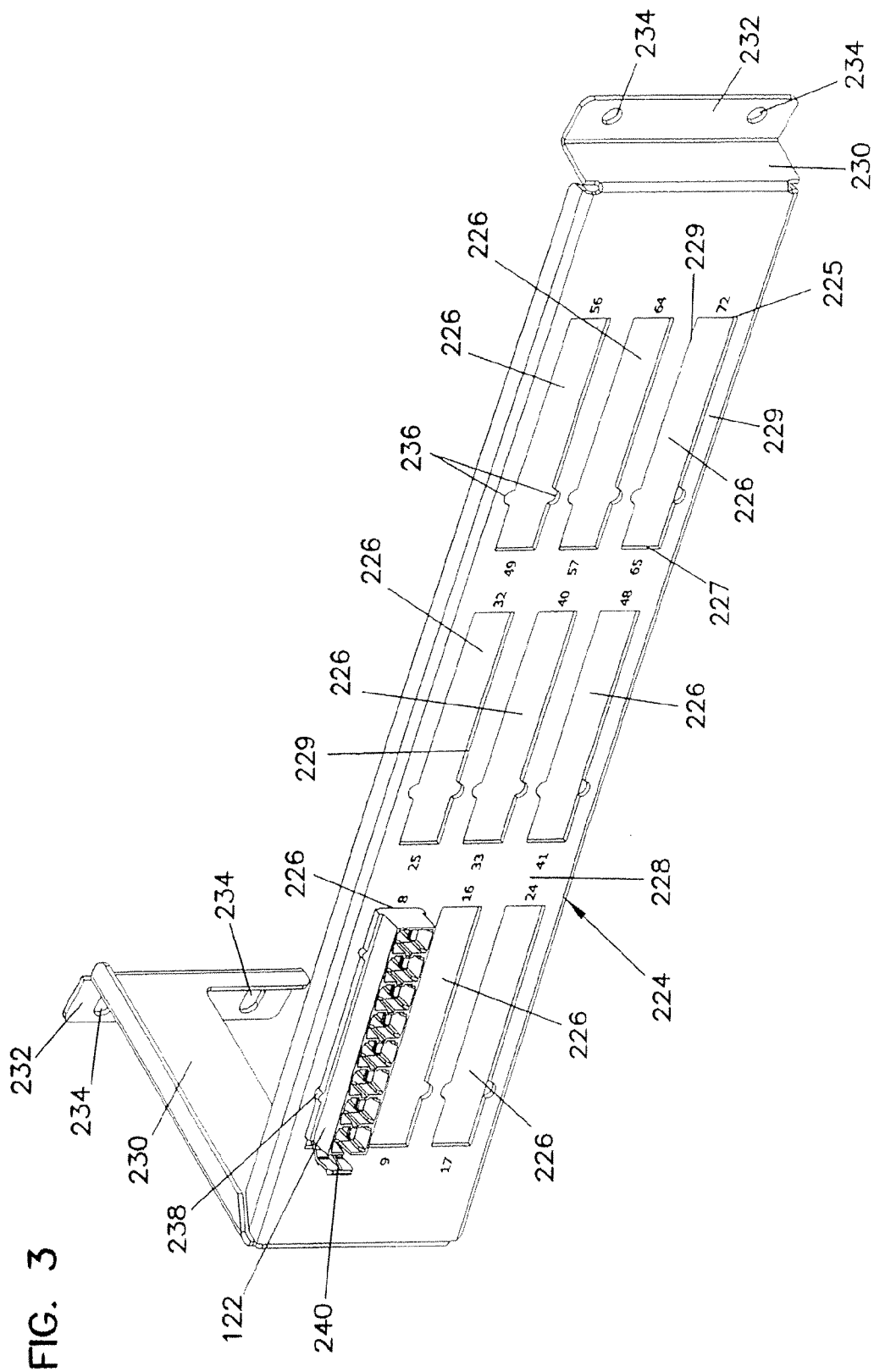
FIG. 3 is a front perspective view of a mounting bulkhead for receiving a multi-position fiber optic connector holder as shown in FIGS. 1 and 2, with a multi-position fiber optic connector holder inserted within one of a plurality of mounting openings.
Figure 9:
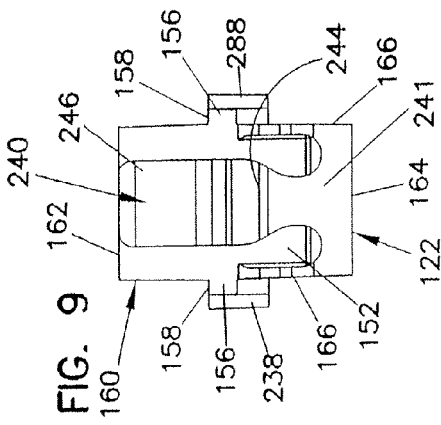
FIG. 9 is a top view of the multi-position fiber optic connector holder of FIG. 4.
Figure 10:
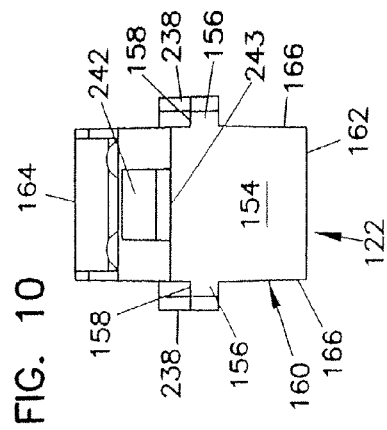
FIG. 10 is a bottom view of the multi-position fiber optic connector holder of FIG. 4.
Figure 8:
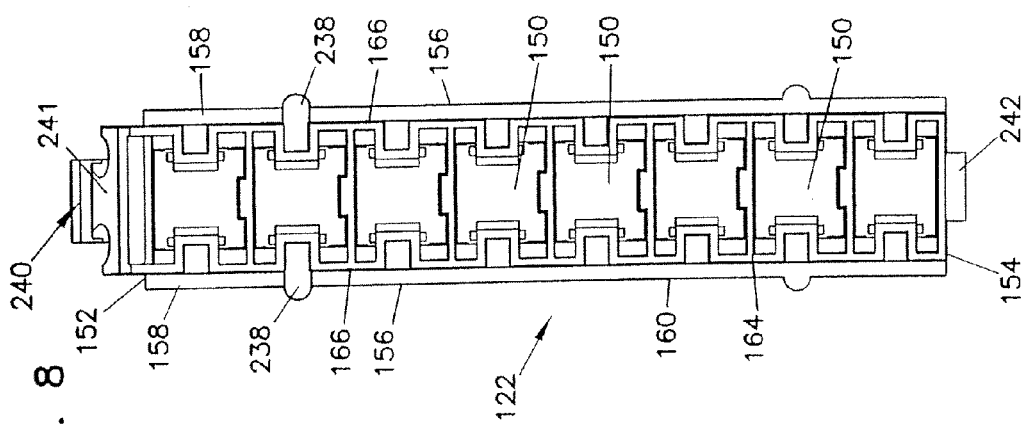
FIG. 8 is a rear view of the multi-position fiber optic connector holder of FIG. 4.
Figure 7:
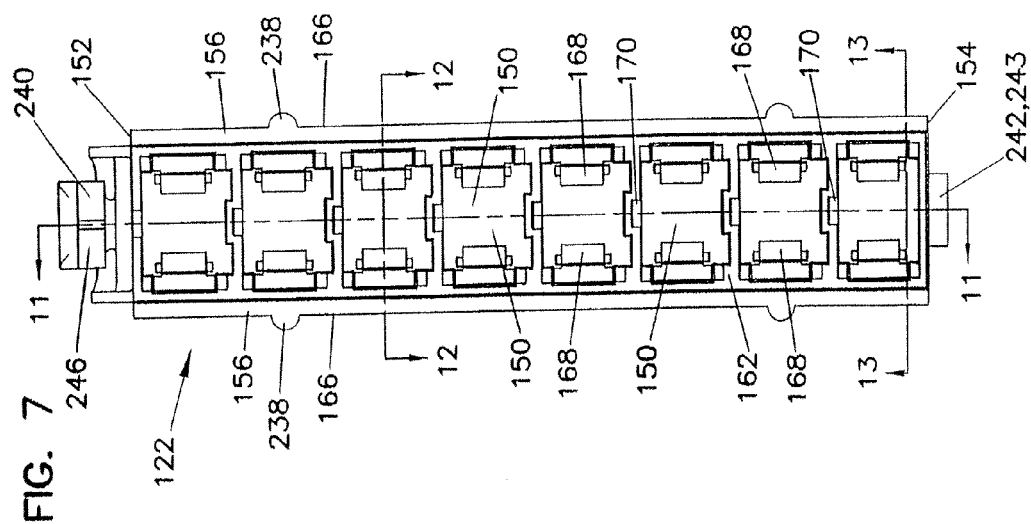
FIG. 7 is a front view of the multi-position fiber optic connector holder of FIG. 4.
Figure 11:
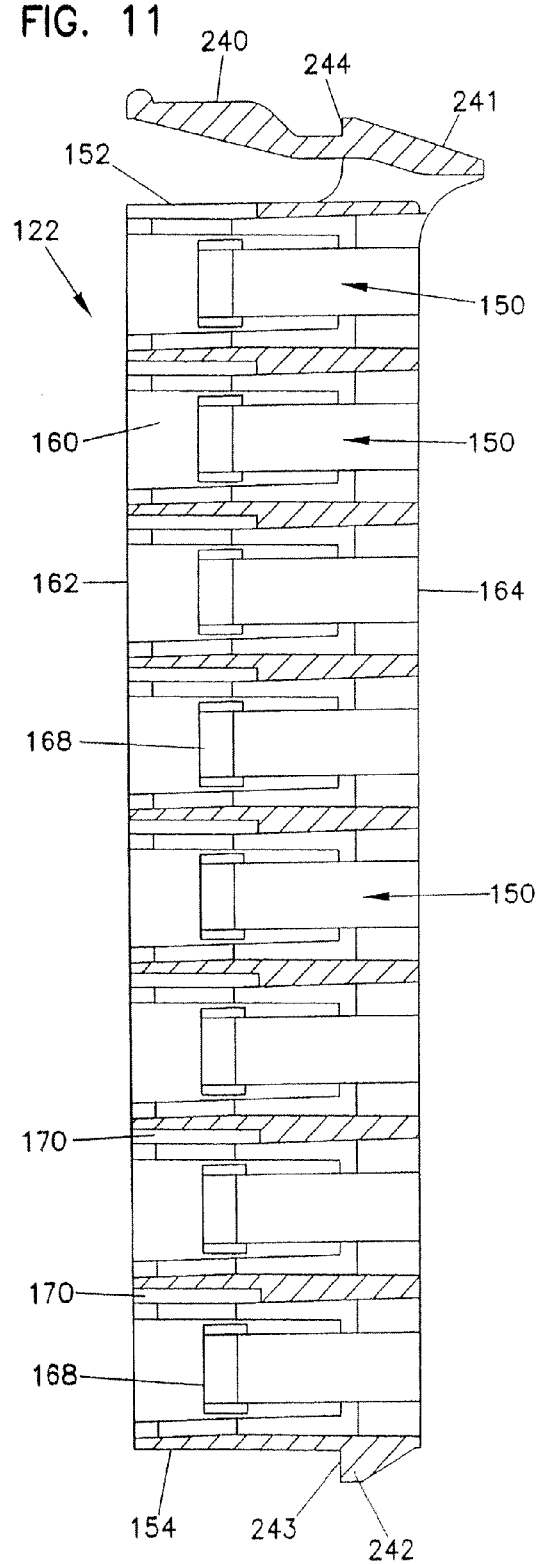
FIG. 11 is a side cross-sectional view of the multi-position fiber optic connector holder of FIG. 7, taken along line 11-11.
Figure 12:
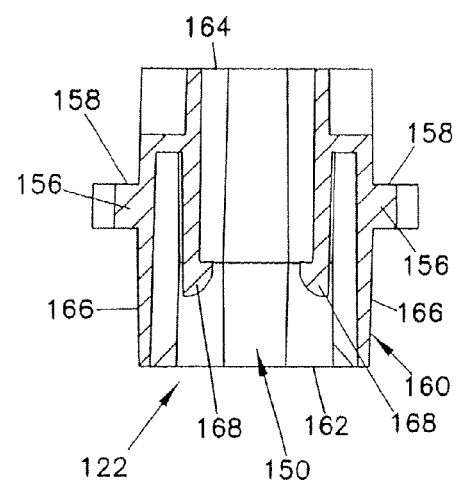
FIG. 12 is a cross-sectional view of the multi-position fiber optic connector holder of FIG. 7, taken along line 12-12.
Figure 13:
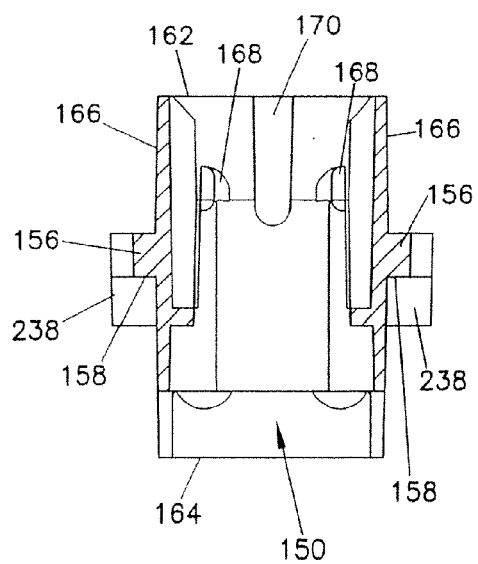
FIG. 13 is a second cross-sectional view of the multi-position fiber optic connector holder of FIG. 7, taken along line 13-13.

Referring now to FIG. 3, a bulkhead 224 is shown with nine openings 226 in a front face 228 including a rear surface 229, and one connector holder 122 positioned within one of the openings 226. A pair of opposing sidewalls 230 extend rearward from opposite ends of front face 228 to a pair of mounting flanges 232. Mounting flanges 232 include fastener openings 234 for mounting bulkhead 224 to one of a cabinet 100 or 200, or a similarly configured cabinet. Bulkhead 224 is similar to bulkhead 124 in FIGS. 1 and 2, except configured so that front face 228 would be angled toward one side of the cabinet within which it is mounted. Angling of bulkheads including devices for receiving fiber optic connectors is known in the industry and provides for improved cable management and density of installation while aiding in bend radius protection, among other advantages. As shown in FIGS. 1 and 2, above, bulkhead 124 has equal length sidewalls 230 so that bulkhead 124 is not angled toward either side of cabinet 100 or 200.

Each opening 226 includes a first or top end 227 and a second or bottom end 225. A pair of ears 236 are positioned one each in a pair of opposing sides extending from top end 227 to bottom end 225, the ears 226 cooperating with a keying feature 238 on connector holder 122 to orient connector holder 122 within opening 226. Connector holder 122 includes a releasable latch 240 at one end and a tab 242 on the opposite end (shown in FIGS. 4 to 6, below) which cooperate to releasably hold connector holder 122 within opening 226. It is desirable that the direction of force that may be applied to connector holder 122 by tension in cables 114 be controlled to prevent accidental release of connector holder 122 from opening 226. Keying features 238 and ears 236 cooperate to ensure that connector holder 122 is properly oriented within opening 226 to resist accidental release caused by such cable tension.

Openings 226 within front face 228 of bulkhead 224 (and bulkhead 124) are sized to also receive up to eight adapters 123 when connector holders 122 are not in position. This allows bulkheads 124 and 224 to provide additional space for optically connecting cables 114 with customer equipment cables 108 for added connection capacity with cabinets 100 and 200, as well as similarly configured cabinets.

Referring now to FIGS. 4 to 13, connector holder 122 includes a housing 160 with eight openings 150 for receiving and releasably holding connectors of cables 114. As described above, cables 114 are terminated by an SC style connector and openings 150 are configured to receive and releasably hold an SC connector. As shown in FIGS. 4 to 6, openings 150 extend through housing 160 from a front 162 to a rear 164 and can each receive a connector of a cable 114 with a dust cap about the polished end face of the optical fiber held by cable 114 and the connector. Such a dust cap is shown in the above-referenced and incorporated U.S. Patent Applications. Alternatively, openings 150 might be close-ended so that the polished end face of the connector can be protected from contamination with or without a dust cap.

Housing 160 includes a first end or top 152 and a second end or bottom 154. Releasable latch 240 is mounted to top 152 and tab 242 is in bottom 154. Extending between top 152 and bottom 154 along sides 166 of housing 160 are rails 156. Keying feature 238 is positioned along rail 156 and extends beyond a rear face 158 of rail 156. A portion of housing 160 extending beyond rear face 158 of rail 156 is sized to fit within opening 226. When inserted within opening 226, rear face 158 of rail 156 engages front face 228 and keying feature 238 engages one of the ears 236 to properly orient top 152 and bottom 154 of housing 160.

To insert housing 160 within opening 226, bottom 154 is first positioned within opening 226 through front face 228 so that a locking face 243 of tab 242 is behind front face 228 at bottom end 225 and engages rear surface 229 of front face 228. Top 152 is then inserted within opening 226. A ramped face 244 of releasable latch 240 engages top end 227 of opening 226 and deflects to permit ramped face 244 and locking face 241 of releasable latch 240 to pass through opening 226. Locking face 241 of releasable latch 240 engages rear surface 229. Opposing both locking faces 241 and 243 are rear faces 158 of rails 156, which are engaging front face 228. Both keying features 238 engage ears 236 of opening 226. Releasable latch 240 includes a finger tab 246 which may be depressed to retract locking face 241 so that locking face 241 disengages from rear surface 229 and permits removal of housing 160 from opening 226. Housing 160 is configured to be inserted through front face 228 of bulkheads 124 or 224 when cabinet 100 or 200 is access through opening 140 in front 126.

Referring now to FIGS. 7 to 13, housing 160 of connector holder 122 includes an orientation slot 170 and latching arms 168 within each opening 150. Latching arms 168 cooperate with latching features of an SC style adapter to allow such connectors to be releasably held within openings 150. For other styles and types of connectors, different latching features might be included within opening 150 to permit these connectors to be releasably held. Orientation slot 170 may cooperate with an orientation feature on the exterior of an SC connector to orient all connectors within openings 150 in the same fashion. Such orientation of connectors is not essential for SC connectors, which have generally symmetrical latching features, but may be desirable for other connectors with different latching configurations.

Figure 14:
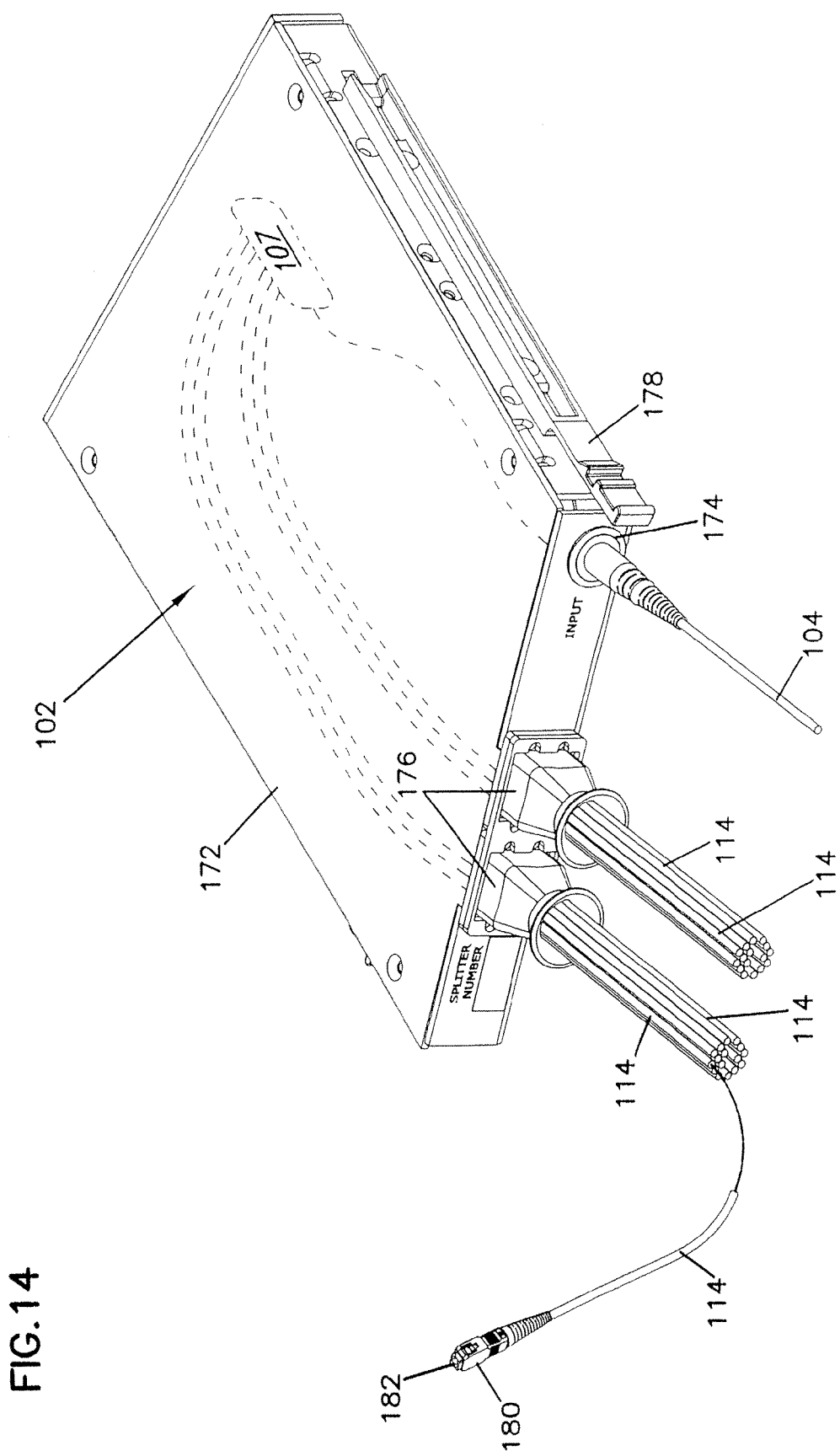
FIG. 14 is a front perspective view of a fiber optic splitter module as shown within the cabinets of FIGS. 1 and 2.

Referring now to FIG. 14, splitter 102 includes a housing 172 with a cable entry 174 for secondary cable 104 and a pair of cable exits 176 (e.g., a boot) for cables 114. As shown, each cable exit 176 allows for up to sixteen cables 114 to exit housing 172. Terminating each cable 114 is a connector 180 with a polished end face 182, shown as an SC connector. Other sizes and layouts of cable exits are anticipated. Different numbers of cables 114 may exit housing 172, depending on the connection requirements to be satisfied and the optical splitter arrangement 107 within the housing 172. Mounted to one side of housing 172 is a releasable latch 178 to hold splitter 102 within splitter mounting area 103 of cabinet 100 or 200, or similarly configured telecommunications connection cabinets.

FIG. 14A shows a fiber optic device module 202 similar in layout to splitter 102 with secondary cable 104 and a plurality of cables 114. Secondary cable 104 may be a single strand cable and module 202 may include a splitter to connector cable 104 with cables 114, such as described above with regard to module 102. Alternatively, cable 104 may be a multi-strand cable and module 202 may serve only as a fan-out module separating the strands into cables 114. Each of the cables 114 are terminated by a connector 180 and each connector 180 is inserted within a connector holder 122. Such a module 202 may be used in the method of adding connection capacity described below.

A method of adding connection capacity to cabinet 100 might include installing a preconfigured splitter 102 in combination with one or more connector holders 122. It is desirable to provide for easy field expansion of connection capacity within cabinet 100 so that cabinet 100 does need to anticipate the ultimate connection configuration for a particular customer service area when installed. Cabinet 100 may be installed with only enough connection capacity to serve the immediate need forecasted for a customer area and allow for incremental expansion as more connections are needed in the area. The following method of adding connection capacity to cabinet 100 is also applicable to cabinet 200 and may be used to initially configure cabinet 100 prior to installation or to expand the capacity of cabinet 100 in the field.

To increase connection capacity within cabinet 100, a splitter 102 preconfigured with a cable 104 and thirty-two cables 114 terminated by connectors 180 is used. The splitter 102 is mounted within splitter mounting area 103 and the free end of cable 104 is led into cable management structure 112 and to splice panel 110. In splice panel 110, the free end of cable 104 is spliced into an end of an OSP cable 106. This splice optically connects OSP cable 106 to each of the cables 114. Connectors 180 of cables 114 are pre-inserted within four connector holders 122. Cables 114 are led from splitter 102 through cable management structure 112 to second cable management structure 116 where excess cable length may be retained within the cable slack storage arrangement. Since splitter 102 may be preconfigured for use with different cabinets as well as cabinet 100, the length of cables 114 of splitter may be longer than required for cabinet 100 and this excess length may be held about the cable slack storage spools 117 (see FIG. 1).

From second cable management area 116, cables 114 and connector holders 122 with connectors 180 inserted are positioned within excess cable storage area 118. Each connector holder 122 is simply snapped into one of the openings 226 of bulkhead 124. Addition of extra connection capacity is now completed. When a customer connection is required, a customer equipment cable 108 is led into cabinet 100 and terminated with a connector 180. This connector is inserted within a rear opening of an adapter 123 within adapter array 120. Alternatively, when cabinet 100 is installed, the rear of all adapters 123 in adapter 122 may have customer equipment cables 108 prewired and these cables led to the customer premises in anticipation of future customer hookups. When such a prewired customer desires a live connection, a cable 114 merely needs to be inserted into the front of the appropriate adapter 123. One of the cables 114 within excess cable storage area 118 is selected and its connector 180 is removed from connector holder 118. The selected cable 114 is re-routed within second cable management area 116 as needed to provide a desired length of cable and the connector 180 is inserted within the appropriate adapter 123 in adapter array 120. If connector 180 of the selected cable 114 includes a dust cap to protect the polished end face of the fiber, this dust cap is removed prior to insertion into the adapter 123.

Splitter 102 includes thirty-two cables 114 and connectors 180, inserted within four connector holders 122 when splitter 102 is installed. As these cables 114 and connectors 180 are transferred into adapter array 120, some or all of the connector holders 122 may be emptied of all connectors 180. When this happens, the empty connector holder 122 may be removed from excess cable storage area 118 and discarded or recycled. Removal of these empty connector holders 122 would free openings 226 in bulkhead 124 to permit connector holders of additional splitters 102 to be installed and more capacity to be added to cabinet 100.

If a connection to customer equipment needs to be terminated, the connector 180 of the appropriate cable 114 may be removed from the adapter 123. The cable 114 is then rerouted within the cable management structure 116 and the connector 180 inserted within an opening 150 of a connector holder 122 within excess cable storage area 118.

Splitter mounting area 103 of cabinet 100 includes spaces to mount up to four splitters 102, while cabinet 200 provides spaces to mount up to eight splitters 102. Thus configured, cabinet 100 has a capacity to connect up to split up to four OSP cables into thirty-two cables 114 each, or up to a total of one hundred twenty eight cables 114. Within adapter array 120 there are a sufficient number of adapters 123 to permit connection of each of these cables 114 to a corresponding customer equipment cable 108.

However, cabinet 200 has the capacity to split up to eight OSP cables into thirty-two cables 114 each, or up to a total of two hundred fifty-six cables 114. Adapter array 120 in cabinet 200 only provides a total of two hundred sixteen adapters 123 for receiving connectors from cables 114. Once adapter array 120 has been fully populated with cables 114, there may be up to forty excess cables 114 within excess cable storage area 118 which are not provided with an adapter 123 for connection with a customer equipment cable 108.

As shown in FIGS. 4 to 13, housing 160 of connector holder 122 with eight openings 150 has generally the same footprint as an array of eight adapters 123. When adapter array 120 has been fully populated with cables 114 from splitters 102, connector holders 122 may be removed from openings 226 in bulkhead 124 and up to eight adapters 123 may be positioned in each opening 226. By fully filling five of the openings in bulkhead 124 with adapters 123, an additional forty cables 114 can be connected with customer equipment cables 108, effectively increasing the capacity of adapter array 120 so that the forty excess cables 114 may be utilized. Even with five of the openings 226 in used by adapters 123, there are still openings 226 remaining for connector holders 122 so that cables 114 can be stored when connections with customer equipment cables are eliminated or changed.

Figure 15:
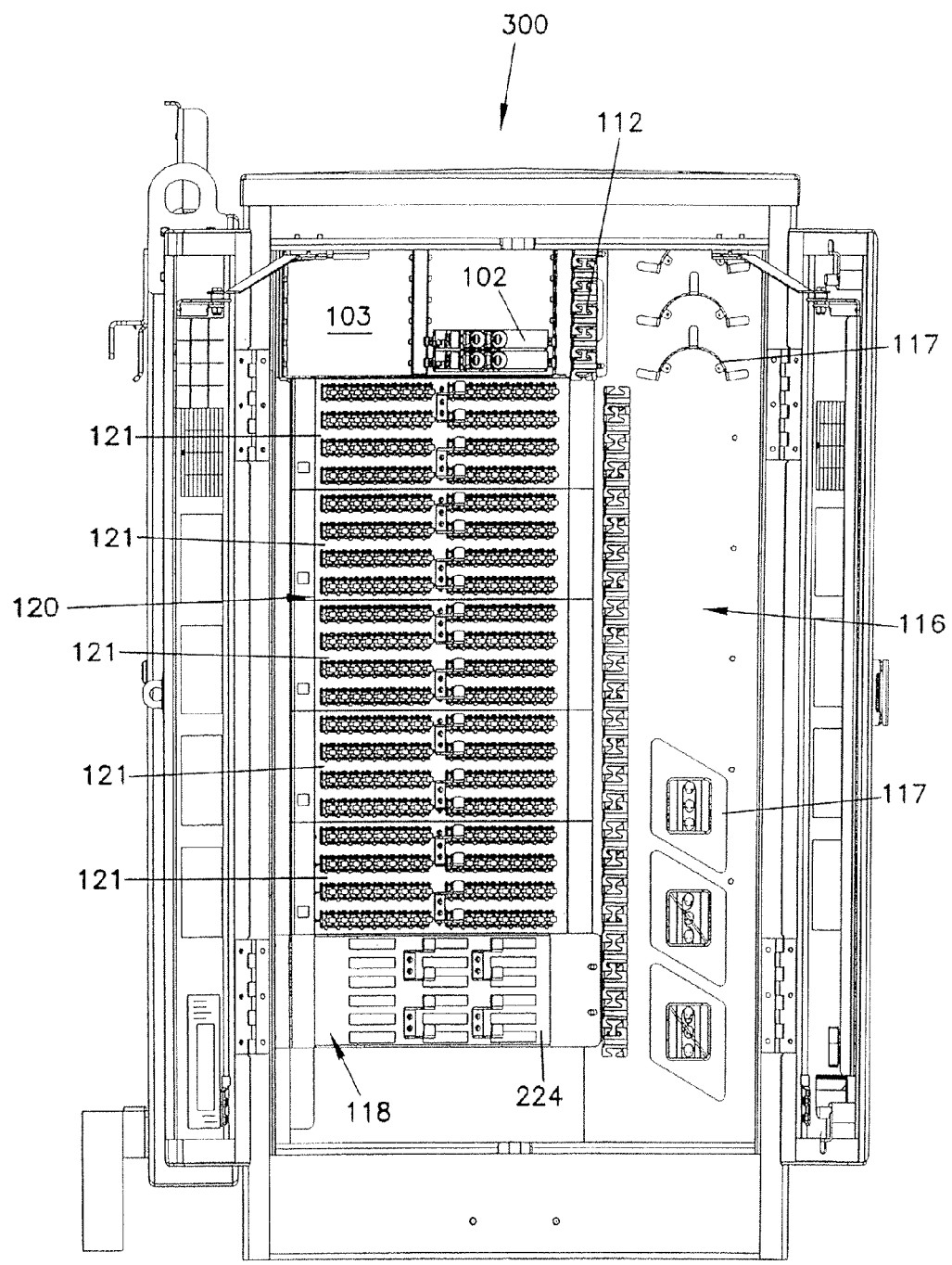
FIG. 15 is a front view of a third embodiment of a telecommunications connection cabinet according to the present invention.

FIG. 15 shows a third alternative embodiment of a telecommunications connection cabinet 300, similar in configuration to cabinets 100 and 200, but including bulkhead 224 in excess cable storage area 118. Adapter panels 121 and bulkhead 224 are angled toward cable management structure and slack storage 116 to improve transfer of cables 114 from cable management structure 116 to adapters 123 and to connector holders 122. In addition, cables supports 302 are provided on both panels 121 and bulkhead 224 to provide support to cables 114 extending to adapters 123 and connector holders 122, respectively.

Figure 16:
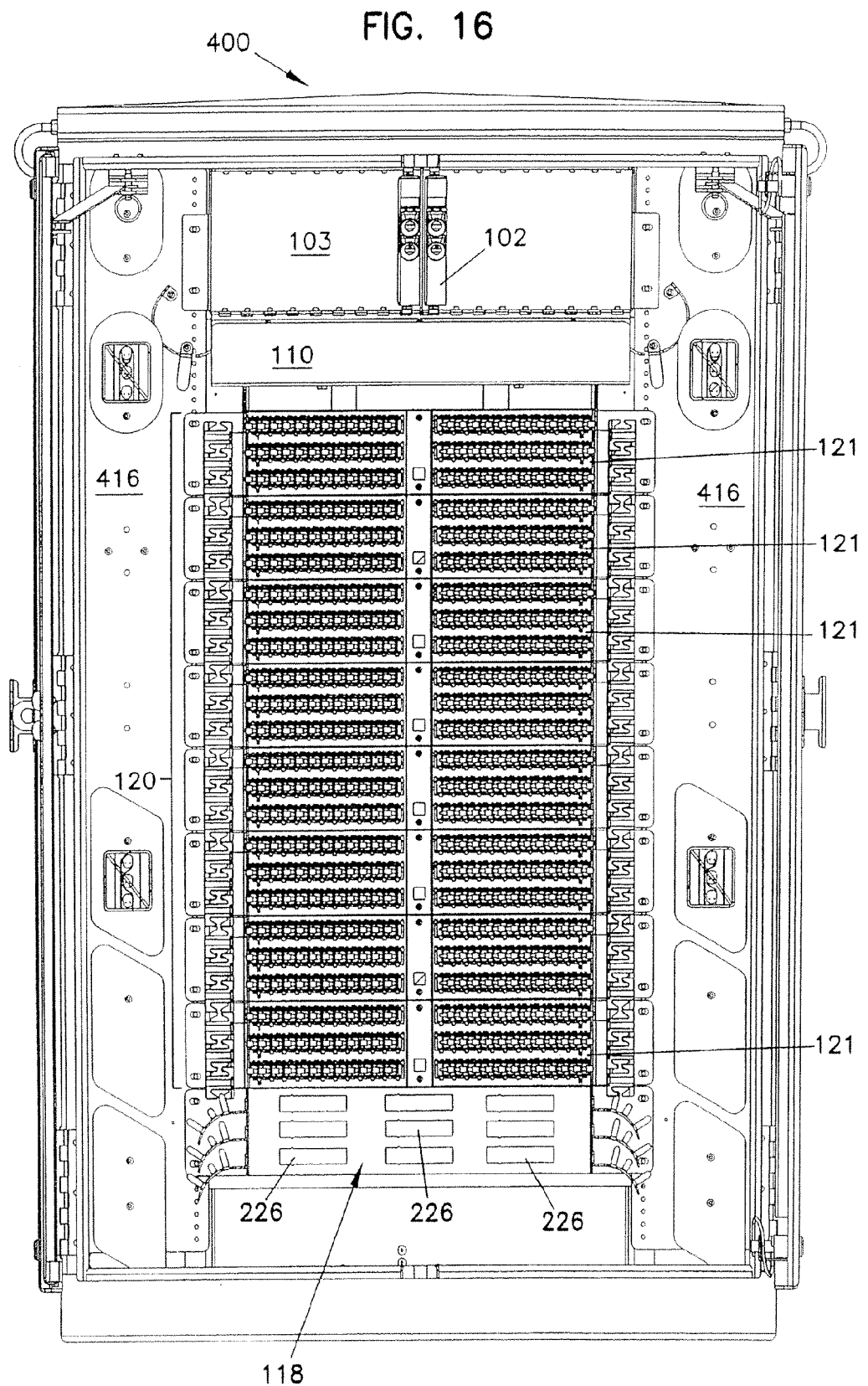
FIG. 16 is a front view of a fourth embodiment of a telecommunications cabinet according to the present invention.

FIG. 16 illustrates a fourth embodiment of a telecommunications connection cabinet 400 according to the present invention. Cabinet 400 is similar in configuration to the previously described cabinets 100, 200 and 300, with a cable a cable management structure 416 with cable slack storage along both sides of adapter array 120 and excess cable storage area 118. Adapters 123 adjacent the left side of panels 121 are angled toward the left side of cabinet 400 and adapters 123 adjacent the right side of panels 121 are angled toward the right side of the cabinet.

Figure 17:
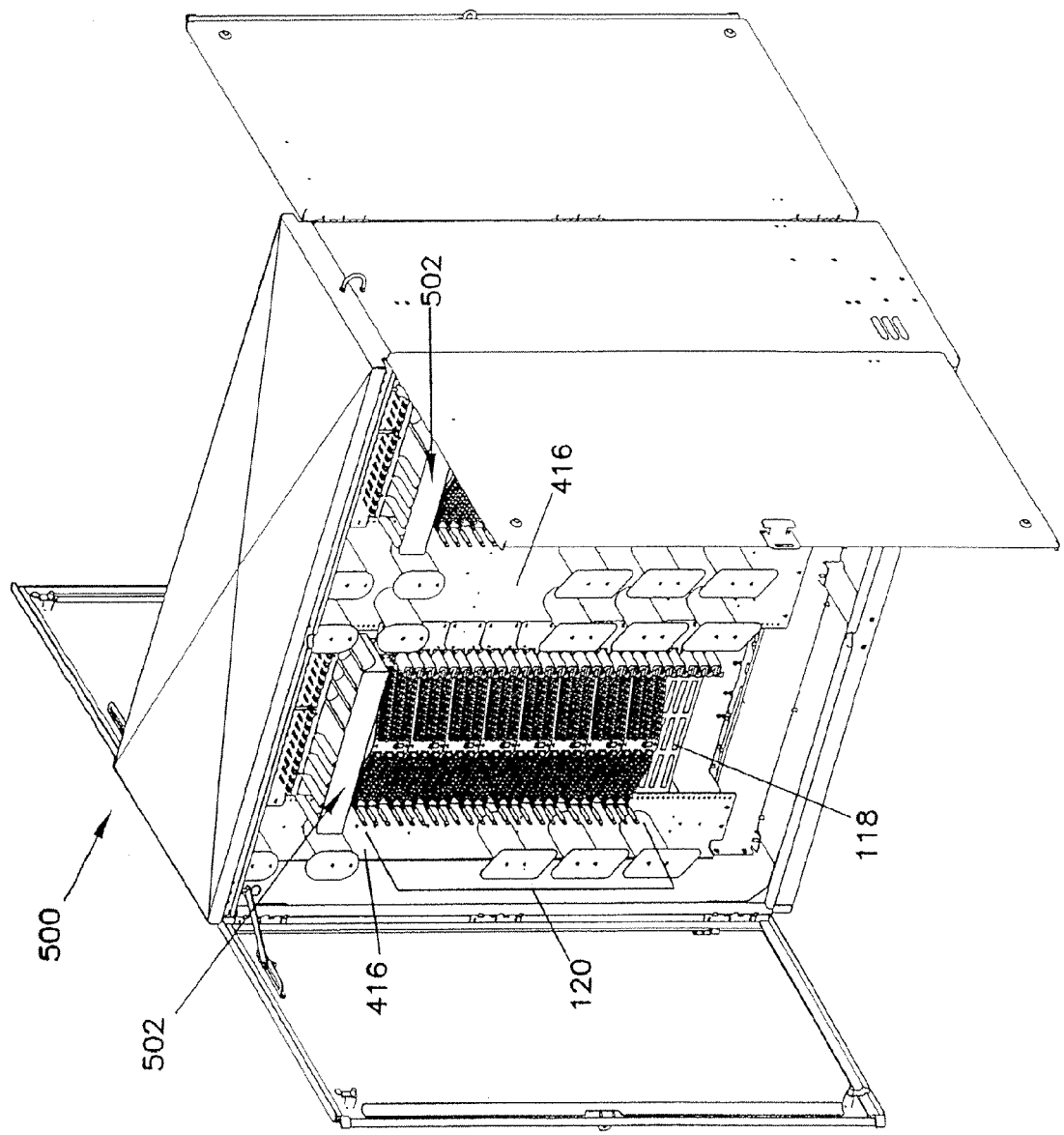
FIG. 17 is a front perspective view of fifth embodiment of a telecommunications connection cabinet according to the present invention.

FIG. 17 is a fifth embodiment of a telecommunications cabinet 500 including side-by-side structure 502 within the cabinet. Each structure 502 is similar in configuration to the contents of cabinet 400.

Figure 18:
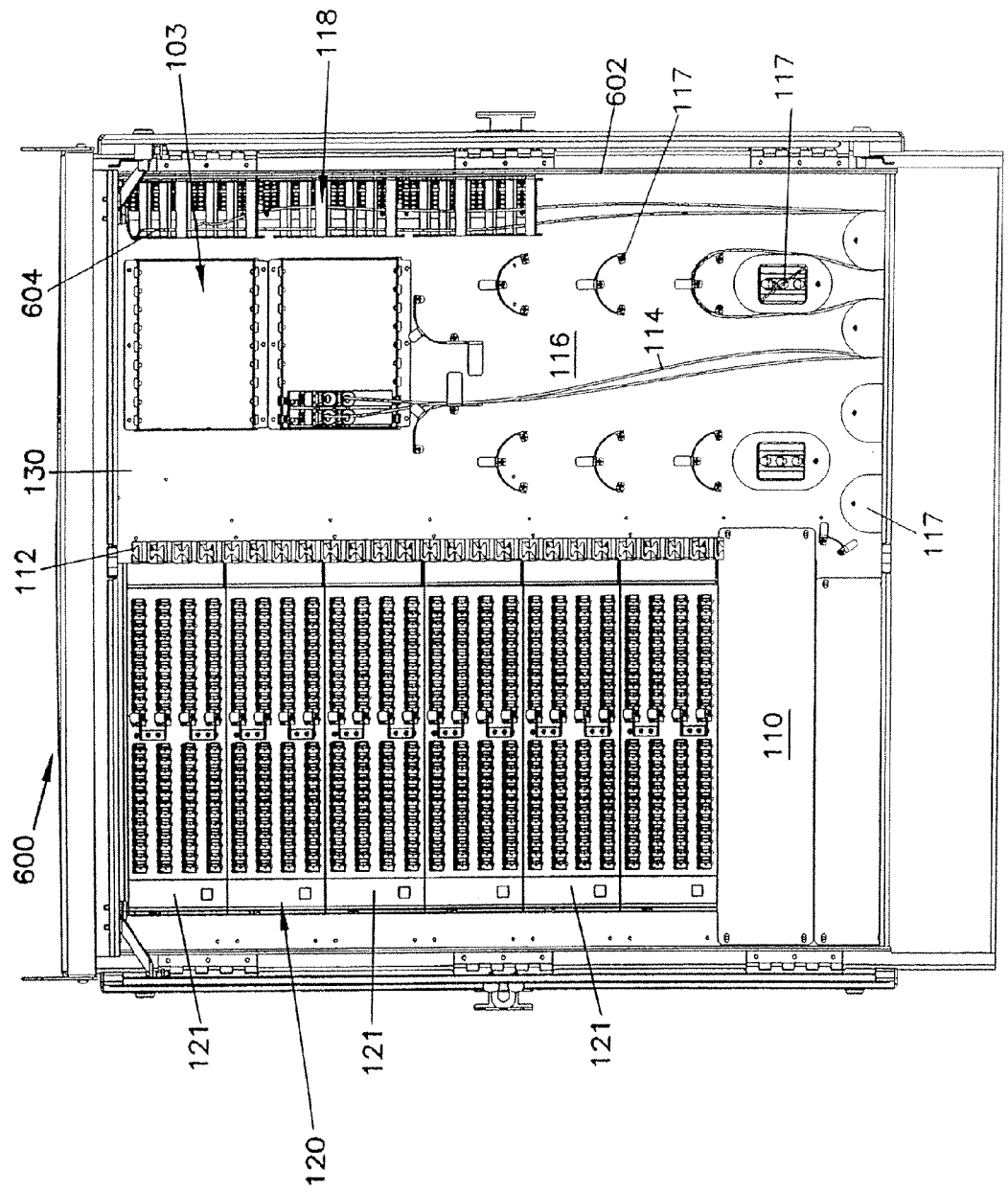
FIG. 18 is a front view of a sixth embodiment of a telecommunications cabinet according to the present invention, with the excess fiber storage area mounted adjacent an inside surface of a side wall.

FIG. 18 is sixth embodiment of a telecommunications cabinet 600 where excess cable storage area 118 is positioned alongside one of an interior wall 602. FIG. 19 shows a bulkhead 604 including a plurality of openings 226 for receiving connector holders 122. The other elements within cabinet 600 are similar to the earlier described cabinets Bulkhead 604 includes a pair of mounting flanges 606 and 608 for connection to the interior 602 and cabinet rear wall 130, respectively.

The above specification, examples and data provide a complete description of the manufacture and use of the invention. Since many embodiments of the invention can be made without departing from the spirit and scope of the invention, the invention resides in the claims hereinafter appended.

What is claimed is:

1. A method of increasing capacity of a telecommunications cabinet by adding a fiber optic splitter, the fiber optic splitter being positioned within a splitter housing, the fiber optic splitter being configured to split an optical signal into a plurality of optical signals that are carried away from the splitter housing by a plurality of splitter output cables that extend outwardly from the splitter housing, each of the splitter output cables being terminated by a fiber optic connector, the method comprising:

pre-inserting a plurality of the fiber optic connectors that terminate the splitter output cables into a connector holder that does not include a functional fiber optic adapter; and positioning the splitter housing and the connector holder within the cabinet, the connector holder being positioned within the cabinet while the pre-inserted fiber optic connectors remain within the connector holder;

wherein the connector holder is mounted in the cabinet at a location separate from the splitter housing.

2. The method of claim 1, wherein the splitter housing is preconfigured with an input cable for carrying to the fiber optic splitter signals desired to be split, wherein the splitter housing is mounted at a splitter mounting location of the cabinet when the splitter housing is positioned within the cabinet, and wherein the input cable is optically connected to an outside cable that is routed into the cabinet.

3. The method of claim 2, wherein the input cable is optically connected to the outside cable by a splice.

4. The method of claim 1, wherein when the connector holder is positioned within the cabinet, the splitter output cables corresponding to the pre-inserted fiber optic connectors are routed within the cabinet while the pre-inserted fiber optic connectors remain within the connector holder.

5. The method of claim 4, wherein the splitter output cables corresponding to the pre-inserted fiber optic connectors are routed within cable management channels within the cabinet while the pre-inserted fiber optic connectors remain within the connector holder.

6. The method of claim 4, wherein the splitter output cables corresponding to the pre-inserted fiber optic connectors are routed in a slack storage arrangement within the cabinet while the pre-inserted fiber optic connectors remain within the connector holder.

7. The method of claim 1, wherein when the connector holder is positioned within the cabinet, the connector holder is connected to a panel within the cabinet by a snap-fit connection while the pre-inserted fiber optic connectors remain within the connector holder.

8. The method of claim 1, wherein the cabinet includes a termination field including a plurality of fiber optic adapters that are pre-cabled to customer premises, and wherein the pre-inserted fiber optic connectors are configured to be removed from the connector holder and inserted into the adapters of the termination field to provide service to the customer premises after the connector holder has been positioned within the cabinet.

9. A method of increasing capacity of a telecommunications cabinet by adding a fiber optic splitter, the fiber optic splitter being positioned within a splitter housing, the fiber optic splitter being configured to split an optical signal into a plurality of optical signals that are carried away from the splitter housing by a plurality of splitter output cables that extend outwardly from the splitter housing, each of the splitter output cables being terminated by a fiber optic connector having a ferrule covered by a dust cap, the method comprising:
    pre-inserting a plurality of the fiber optic connectors that terminate the splitter output cables into a connector storage housing that receives the fiber optic connectors while the dust caps remain on the ferrules;
    positioning the splitter housing at a first location in the telecommunications cabinet; and
    positioning the connector storage housing at a second location within the telecommunications cabinet while the pre-inserted fiber optic connectors remain within the connector storage housing such that the fiber optic connectors are loaded into the telecommunications cabinet as a unit, the second location being separate from the first location.

10. A method increasing capacity of a telecommunications cabinet by adding a fiber optic splitter, the fiber optic splitter being positioned within a splitter housing, the fiber optic splitter being configured to split an optical signal into a plurality of optical signals that are carried away from the splitter housing by a plurality of splitter output cables that extend outwardly from the splitter housing, each of the splitter output cables being terminated by a fiber optic connector, the method comprising:
    pre-inserting a plurality of the fiber optic connectors that terminate the splitter output cables into a connector storage housing;
    positioning the splitter housing at a first location in the telecommunications cabinet; and
    positioning the connector storage housing at a second location within the telecommunications cabinet while the pre-inserted fiber optic connectors remain within the connector storage housing such that the fiber optic connectors are loaded into the telecommunications cabinet as a unit, the first location being separate from the second location.

11. The method of claim 10, wherein the splitter housing is positioned in the telecommunications cabinet before the connector storage housing is positioned in the telecommunications cabinet.

12. A method increasing capacity of a telecommunications cabinet by adding a fiber optic splitter, the fiber optic splitter being positioned within a splitter housing, the fiber optic splitter being configured to split an optical signal into a plurality of optical signals that are carried away from the splitter housing by a plurality of splitter output cables that extend outwardly from the splitter housing, each of the splitter output cables being terminated by a fiber optic connector, the method comprising:
    pre-inserting a plurality of the fiber optic connectors that terminate the splitter output cables into a means for storing the fiber optic connectors;
    positioning the splitter housing at a splitter mounting location in the telecommunications cabinet; and
    positioning the means for storing the fiber optic connectors at a connector storage location within the telecommunications cabinet while the pre-inserted fiber optic connectors remain within the means for storing the fiber optic connectors such that the fiber optic connectors are loaded into the telecommunications cabinet as a unit, the connector storage location being separate from the splitter mounting location.

13. The method of claim 9, wherein the splitter housing is preconfigured with an input cable for carrying to the fiber optic splitter signals desired to be split, wherein the splitter housing is mounted at a splitter mounting location of the cabinet when the splitter housing is positioned within the cabinet, and wherein the input cable is optically connected to an outside cable that is routed into the cabinet.

14. The method of claim 13, wherein the input cable is optically connected to the outside cable by a splice.

15. The method of claim 9, wherein when the connector storage housing is positioned within the cabinet, the splitter output cables corresponding to the pre-inserted fiber optic connectors are routed within the cabinet while the pre-inserted fiber optic connectors remain within the connector storage housing.

16. The method of claim 15, wherein the splitter output cables corresponding to the pre-inserted plurality of fiber optic connectors are routed within cable management channels within the cabinet while the pre-inserted fiber optic connectors remain within the connector storage housing.

17. The method of claim 15, wherein the splitter output cables corresponding to the pre-inserted plurality of fiber optic connectors are routed in a slack storage arrangement within the cabinet while the pre-inserted fiber optic connectors remain within the connector storage housing.

18. The method of claim 9, wherein when the connector storage housing is positioned within the cabinet, the connector storage housing is connected to a panel within the cabinet by a snap-fit connection while the pre-inserted fiber optic connectors remain within the connector storage housing.

19. The method of claim 9, wherein the cabinet includes a termination field including a plurality of fiber optic adapters that are pre-cabled to customer premises, and wherein after the connector storage housing has been positioned within the cabinet, the pre-inserted fiber optic connectors are removed from the connector storage housing and inserted into the adapters of the termination field to provide service to the customer premises.

20. The method of claim 9, wherein the connector storage housing includes a one-piece connector holder having a front side and an opposite rear side, the front side of the connector holder defining a plurality of openings, the openings being configured to receive the fiber optic connectors only from the front side of the one-piece connector holder.

21. The method of claim 20, wherein the one-piece connector holder includes only 8 openings.

22. The method of claim 9, wherein the second location includes a bulkhead defining a plurality of bulkhead openings, and wherein the connector storage housing is snap-fit within one of the bulkhead openings.

23. The method of claim 22, wherein the connector storage housing is elongated and includes opposite elongated sides having rails, wherein keying features project outwardly from the rails, and wherein the bulkhead openings include notches for receiving the keying features.

24. The method of claim 23, wherein a resilient latch is integrally formed with one end of the connector storage housing, and a tab is integrally formed with an opposite end of the connector storage housing.

25. The method of claim 20, further comprising a pair of resilient latching arms positioned within each of the openings of the one-piece connector holder, the latching arms being integral with a main body of the one-piece connector holder.

26. The method of claim 9, further comprising a cable exit member that projects outwardly from the splitter housing, wherein a plurality of the splitter output cables are routed through the cable exit member.

27. The method of claim 1, wherein the connector holder defines a plurality of separate openings, each opening being adapted for receiving one of the fiber optic connectors.

28. The method of claim 1, wherein the connector holder includes a block defining a plurality of openings for receiving the fiber optic connectors.

29. The method of claim 9, wherein the connector storage housing defines a plurality of separate openings, each opening being adapted for receiving one of the fiber optic connectors.

30. The method of claim 9, wherein the connector storage housing includes a block defining a plurality of openings for receiving the fiber optic connectors.

31. The method of claim 10, wherein the connector storage housing defines a plurality of separate openings, each opening being adapted for receiving one of the fiber optic connectors.

32. The method of claim 10, wherein the connector storage housing includes a block defining a plurality of openings for receiving the fiber optic connectors.

33. The method of claim 10, wherein the splitter housing is preconfigured with an input cable for carrying to the fiber optic splitter signals desired to be split, wherein the splitter housing is mounted at a splitter mounting location of the cabinet when the splitter housing is positioned within the cabinet, and wherein the input cable is optically connected to an outside cable that is routed into the cabinet.

34. The method of claim 33, wherein the input cable is optically connected to the outside cable by a splice.

35. The method of claim 10, wherein when the connector storage housing is positioned within the cabinet, the splitter output cables corresponding to the pre-inserted fiber optic connectors are routed within the cabinet while the pre-inserted fiber optic connectors remain within the connector storage housing.

36. The method of claim 35, wherein the splitter output cables corresponding to the pre-inserted fiber optic connectors are routed within cable management channels within the cabinet while the pre-inserted fiber optic connectors remain within the connector storage housing.

37. The method of claim 35, wherein the splitter output cables corresponding to the pre-inserted fiber optic connectors are routed in a slack storage arrangement within the cabinet while the pre-inserted fiber optic connectors remain within the connector storage housing.

38. The method of claim 10, wherein when the connector storage housing is positioned within the cabinet, the connector storage housing is connected to a panel within the cabinet by a snap-fit connection while the pre-inserted fiber optic connectors remain within the connector storage housing.

39. The method of claim 10, wherein the cabinet includes a termination field including a plurality of fiber optic adapters that are pre-cabled to customer premises, and wherein after the connector storage housing has been positioned within the cabinet, the pre-inserted fiber optic connectors are removed from the connector storage housing and inserted into the adapters of the termination field to provide service to the customer premises.

\* \* \* \* \*